Aug. 2 1927.

D. L. CLINE 1,637,985

MERCANTILE CREDIT FORM

Filed May 5. 1926

| $5.00 | CUSTOMER'S TRADE CHECK |  |
|---|---|---|
|  | GOOD FOR |  |
| ACCOUNT No. 14 | FIVE DOLLARS IN MERCHANDISE | TOTAL $100.00 CREDIT |
| CHECK No. 6 | at CLINE'S DRY GOODS STORE when properly signed MEDFORD, OKLA. | CREDIT $30.00 USED |
| $5.00 D. L. Cline Signature of Merchant | John Doe Signature of Customer | $5.00 |

Inventor
Daniel L. Cline.
By Monroe E. Miller
Attorney.

Patented Aug. 2, 1927.

1,637,985

UNITED STATES PATENT OFFICE.

DANIEL L. CLINE, OF MEDFORD, OKLAHOMA.

MERCANTILE CREDIT FORM.

Application filed May 5, 1926. Serial No. 106,856.

The present invention relates to mercantile credit systems and forms, and aims to provide a novel check to be issued to the customer as a token or certificate of credit and having thereon in addition to the value of merchandise obtainable on said check, appropriately designated spaces for indicating the total amount of credit extended and the amount of credit used up to and including the check.

The invention also has for an object the issuance of credit by a merchant to a customer on a safe, convenient and satisfactory basis, to provide for mutually satisfactory transactions between the merchant and customer, as well as simplifying the account of a credit customer, and providing for other advantages.

The invention is illustrated in the accompanying drawing, wherein the figure is a face view of a credit check form.

When an account is opened and credit is issued to a customer, trade or credit checks are issued to the customer to the amount of the credit extended. One of the check forms is shown in the drawing. This check form has the value of five dollars, as indicated thereon, although the checks may have various values, the same as currency, and the face of the form has printed or otherwise provided thereon wording to indicate that the token or certificate is good for the corresponding amount in merchandise at the store of the merchant who issued the credit. The check form has the space or line 31 for the signature of the merchant, whose signature is necessary to render the check valid, and the form also has a space or line 32 for the signature of the customer so that the customer's endorsement is necessary before the check is accepted in exchange for merchandise. The form also has a space 33 for the number of the account; a space 34 for the serial number of the check; a space 35 to indicate the total amount of the account or credit extended; and the space 36 to indicate the amount of credit used up to and including the particular check of the series issued to the customer. The trade checks are given to the customer when the note is completed and signed, and the spaces 33, 34, 35 and 36 are filled in, so as to identify the account in the space 33 and the particular check of the series in the space 34. On each check there will appear in the space 35 the total amount of the credit extended, for convenience both by the merchant and customer, and the spaces 36 of the successive checks will indicate the increasing amounts of credit used, so that both the merchant and customer can observe at a glance the condition of the account. Furthermore, the signature of the customer to the check is an acknowledgment on the part of the customer of the amount of credit used, indicated in the space 36, of the total credit allowed as indicated in the space 35.

The trade checks may be supplied in book or pad form, and the numbers in the spaces 33 and 34 and amounts in the spaces 35 and 36 may be printed therein, or such spaces may be left blank and filled in by the merchant when establishing credit for the customer.

In addition to the trade or credit check, which is of paper, cloth, or other suitable material, there are used, for smaller amounts and for making change, checks or value tokens of any suitable kind (not shown).

The present credit system requires no elaborate bookkeeping, and the system is simple and convenient. The merchant may hold a note signed by the customer for the amount of credit allowed the customer, and the paper checks used by the customer in making purchases indicate both the amount of credit allowed and the amount of credit used. The account may be settled quickly and conveniently at any time. If the entire credit has not been used, the remaining credit or trade checks may be returned to the merchant when the amount of credit used has been paid for. The present system avoids possibility of errors such as occur in ordinary charge accounts, inasmuch as there are no charge tickets or slips, no posting of such charge tickets to day books, no transferring of tickets to day books, no transferring of charges from day books to ledgers, and the like. There being no bookkeeping will eliminate errors such as arise in entering credits and debits in charge accounts, and the present system avoids misunderstandings, disputes, overcharges and dissatisfaction. The expense of a bookkeeper is also avoided, as well as saving the merchant's time, and keeping the credit man in direct contact with the creditor. The credit, furthermore, cannot be run higher than that allowed. The system is beneficial for the creditor, by keeping the creditor in direct contact with the account at all times, inasmuch as the checks are used the creditor is reminded of the amount of credit used, indicated in space 36, in comparison with the amount of credit allowed, indicated in the space 35.

The system may be used by various merchants and for different kinds of business.

Having thus described the invention, what is claimed as new is:—

1. For use in a credit system, a check used as one of a series, and having an indication thereon of value of merchandise obtainable on that check, and further having appropriately designated spaces for indicating the total amount of credit extended and the amount of credit used up to and including the check.

2. For use in a credit system, a check to be used as one of a series, and having an indication thereon of value of merchandise obtainable on that check, and further having appropriately designated spaces for the signatures of the creditor and the debtor, and also having appropriately designated spaces for indicating the number of the account, the serial number of the check, the total amount of credit extended, and the amount of credit used up to and including the check.

In testimony whereof I hereunto affix my signature.

DANIEL L. CLINE.